US011868162B2

(12) United States Patent
Menachem et al.

(10) Patent No.: US 11,868,162 B2
(45) Date of Patent: Jan. 9, 2024

(54) FOLLOWER MODE VIDEO OPERATION

(71) Applicant: Apple Inc., Cupertino, CA (US)

(72) Inventors: Assaf Menachem, Hod Hasharon (IL); Peter F. Holland, Los Gatos, CA (US); Yung-Chin Chen, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 53 days.

(21) Appl. No.: 18/083,193

(22) Filed: Dec. 16, 2022

(65) Prior Publication Data

US 2023/0124009 A1 Apr. 20, 2023

Related U.S. Application Data

(63) Continuation of application No. 17/148,512, filed on Jan. 13, 2021, now Pat. No. 11,537,347.

(60) Provisional application No. 63/078,300, filed on Sep. 14, 2020.

(51) Int. Cl.
*G06F 3/14* (2006.01)
*G09G 5/12* (2006.01)

(52) U.S. Cl.
CPC ............ *G06F 3/1431* (2013.01); *G09G 5/12* (2013.01); *G09G 2310/08* (2013.01); *G09G 2360/04* (2013.01)

(58) Field of Classification Search
CPC .... G06F 3/1431; G09G 5/12; G09G 2310/08; G09G 2360/04
See application file for complete search history.

(56) References Cited

U.S. PATENT DOCUMENTS

| | | | |
|---|---|---|---|
| 7,804,497 | B2 | 9/2010 | Song et al. |
| 8,730,230 | B2 | 5/2014 | Shiuan et al. |
| 2009/0295731 | A1 | 12/2009 | Kim et al. |
| 2012/0081567 | A1 | 4/2012 | Cote |
| 2016/0098116 | A1 | 4/2016 | Park et al. |
| 2016/0239249 | A1 | 8/2016 | Lee et al. |
| 2021/0067830 | A1 | 3/2021 | Batmunkh |

OTHER PUBLICATIONS

Miroll et. al., 'Reverse genlock for synchronous tiled display walls with Smart Internet Displays,' IEEE Second International Conference on Consumer Electronics, Berlin (ICCE—Berlin), Oct. 2012, pp. 1-5.

Katseff, et. al., 'On the synchronization and display of multiple full-motion video streams,' Proceedings of TRICOMM '91: IEEE Conference on Communications Software: Communications for Distributed Applications and Systems, New Jersey, Apr. 1991, pp. 3-9.

(Continued)

*Primary Examiner* — Abbas I Abdulselam
(74) *Attorney, Agent, or Firm* — Fletcher Yoder, P.C.

(57) ABSTRACT

A method may include receiving, via a processor, a frame of image data, such that the frame of image data may include an active portion and an idle portion. The active portion may include data for presenting one or more images via a first display of a first electronic device. The method may also include receiving a signal from a second electronic device during the idle portion of the frame of image data, such that the second electronic device is separate from the first display. The method may then involve initiating processing of the frame of image data in response to the signal being received from the second electronic device.

20 Claims, 6 Drawing Sheets

(56) References Cited

OTHER PUBLICATIONS

Eitzmann, Gregory, et. al.; "Chapter 3. Building Blocks of a Video Format" dated Dec. 31, 1996 (XP055874246); https://techpubs.jurassic.nl/manuals/0640/developer/VFC_PG/sgi_html/front.html [(retrieved from the Internet: https://techpubs.jurassic.nl/manuals/0640/developer/vfc_PG/sgi_html/ch3.html—retrived Dec. 17, 2021).

International Search Report & Written Opinion for PCT Application No. PCT/US2021/050112 dated Jan. 4, 2022; 12 pgs.

FOLLOWER MODE VIDEO OPERATION

CROSS-REFERENCE TO RELATED APPLICATION

This application is a continuation of U.S. patent application Ser. No. 17/148,512 entitled "FOLLOWER MODE VIDEO OPERATION," filed on Jan. 13, 2021, which claims priority to and the benefit of U.S. Provisional Application No. 63/078,300, filed Sep. 14, 2020, each of which is hereby incorporated herein by reference in its entirety for all purposes.

BACKGROUND

The present disclosure relates generally to employing different video modes of operations in an electronic device using signals between different display devices.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An integrated electronic display may operate using a common clock signal with corresponding image processing circuitry. However, when preparing image data for display via an external display, the common clock signal and a clock signal for the external display may drift with respect to each other. As such, improved systems and methods for synchronizing clock signals between different devices may be useful.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates generally to electronic displays and, more particularly, to improving coordination between two electronic devices to display image data using two electronic displays. As mentioned above, an integrated electronic display may operate based on a common clock signal with image processing circuitry (e.g., display pipeline) of the electronic device. The image processing circuitry may prepare image data for the electronic display and the electronic display may display the image data on the basis of the common clock signal. External displays, however, may not use the same common clock signals. That is, an external display may use a separate clock signal to coordinate the presentation of image data via the external display. However, when the image processing circuitry is employed to provide image data for the electronic display connected thereto and the external display, a drift between the two clock signals may cause image data provided to the external display and to the electronic device to become out of sync.

With the foregoing in mind, in some embodiments, the image processing circuitry of the electronic device may prepare image data for the external display, such that the image processing circuitry operates as a follower of the external display. That is, the external display may coordinate or control the timing of the image processing circuitry. In some embodiments, the image processing circuitry may receive a frame of image data that includes a time period or portion of the frame of image data that corresponds to an IDLE state. The image processing circuitry may wait for an external trigger signal during the IDLE state to start processing the next frame, thereby ensuring that the image processing circuitry and the external display remain in sync.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

As discussed above, image processing circuitry of an electronic device may prepare image data for the external display, such that the image processing circuitry operates as a follower of the external display. In this way, the external display may control the timing of the image processing circuitry. Additional details with regard to employing the image processing circuitry as a follower of the external display will be discussed below with reference to FIGS. 1-8.

Figure 1:
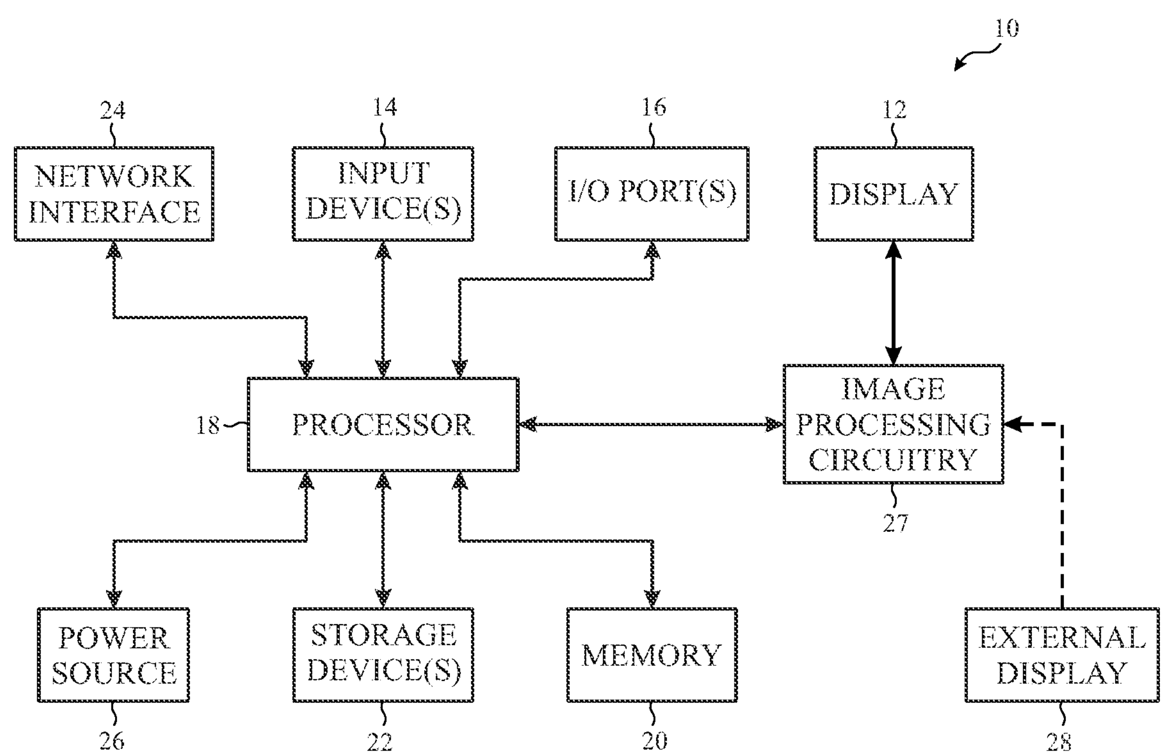
FIG. 1 is a block diagram of an electronic device with a display, where the electronic device includes hardware accelerators, in accordance with an embodiment of the present disclosure.

By way of introduction, FIG. 1 illustrates a block diagram of an electronic device 10. The electronic device 10 may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes an electronic display 12, one or more input devices 14, one or more input/output (I/O) ports 16, a processor(s) 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

The processor(s) 18 may execute instruction stored in local memory 20 and/or the main memory storage device 22 to perform operations, such as generating and/or transmitting image data. As such, the processor(s) 18 may include one or more processors, such as one or more microprocessors, one or more application specific processors (ASICs), one or more field programmable logic arrays (FPGAs), one or more graphics processing units (GPUs), or the like. Furthermore, as previously noted, the processor(s) 18 may include one or more separate processing logical cores that each process data according to executable instructions.

The local memory 20 and/or the main memory storage device 22 may store the executable instructions as well as data to be processed by the cores of the processor(s) 18. Thus, the local memory 20 and/or the main memory storage device 22 may include one or more tangible, non-transitory, computer-readable media. For example, the local memory 20 and/or the main memory storage device 22 may include random access memory (RAM), read only memory (ROM), rewritable non-volatile memory such as flash memory, hard drives, optical discs, and the like.

The network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G, LTE, or 5G cellular network. The network interface 24 includes one or more antennas configured to communicate over network(s) connected to the electronic device 10. The power source 26 may include any suitable source of energy, such as a rechargeable lithium polymer (Li-poly) battery and/or an alternating current (AC) power converter.

The I/O ports 16 may enable the electronic device 10 to receive input data and/or output data using port connections. For example, a portable storage device may be connected to an I/O port 16 (e.g., Universal Serial Bus (USB)), thereby enabling the processor(s) 18 to communicate data with the portable storage device. The I/O ports 16 may include one or more speakers that output audio from the electronic device 10. The processor(s) 18 may include one or more coprocessors or other microprocessors configured to supplement the capabilities of a primary processor (e.g., central processing unit).

The input devices 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. The input devices 14 may include touch-sensing components in the electronic display 12. In such embodiments, the touch sensing components may receive user inputs by detecting occurrence and/or position of an object touching the surface of the electronic display 12.

The electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. In some embodiments, the electronic display 12 may be a display using liquid crystal display (LCD), a self-emissive display, such as an organic light-emitting diode (OLED) display, or the like.

The electronic display 12 may receive image data to present via image processing circuitry 27. The image processing circuitry 27 or display pipeline may include one or more circuit components that process image data provided by the processor(s) 18 to enable the display 12 to present the image data. As such, the image processing circuitry 27 may include components to perform various operations, such as corrections (e.g., applying a Bayer filter), noise reduction, image scaling, gamma correction, image enhancement, color space conversion (e.g., between formats such as RGB, YUV or YCbCr), chroma subsampling, framerate conversion, image compression/video compression (e.g., JPEG), and computer data storage/data transmission.

In some embodiments, the electronic device 10 may be communicatively coupled to an external display 28. The external display 28 may correspond to an additional display device, such as a monitor, a tablet screen, or the like. In addition, the external display 28 may include electronic glasses, a handheld device, or any suitable display device that may be external or separate from the electronic device 10 and may present image data. The display 12 and the external display 28 may each operate using a respective clock signal provided by respective clock circuits. As image data is presented via the display 12 and the external display 28 over time, the clock signals received from these two clock circuits may drift relative to each other. As a result, the image data depicted on the display 12 and the external display 28 may become unsynchronized. To better synchronize the presentation of the image data via the external display 28 and the external display 12, the image processing circuitry 27 may receive a follower-go signal from the external display 12 during a portion of time of a frame of the image data. That is, each frame of image data may include an IDLE portion in which the follower-go signal may be received from the external display 28. In response to receiving the follower-go signal, the image processing circuitry 27 may proceed to process the remaining portion of the frame of image data and provide the resultant image data to the display 12 and the external display 28, such that the two display may present the image data more synchronously. Indeed, the follower-go signal ensures that the display 12 operates based on the clock signal used to control the external display 28, thereby ensuring that the two displays are synchronous.

Figure 2:
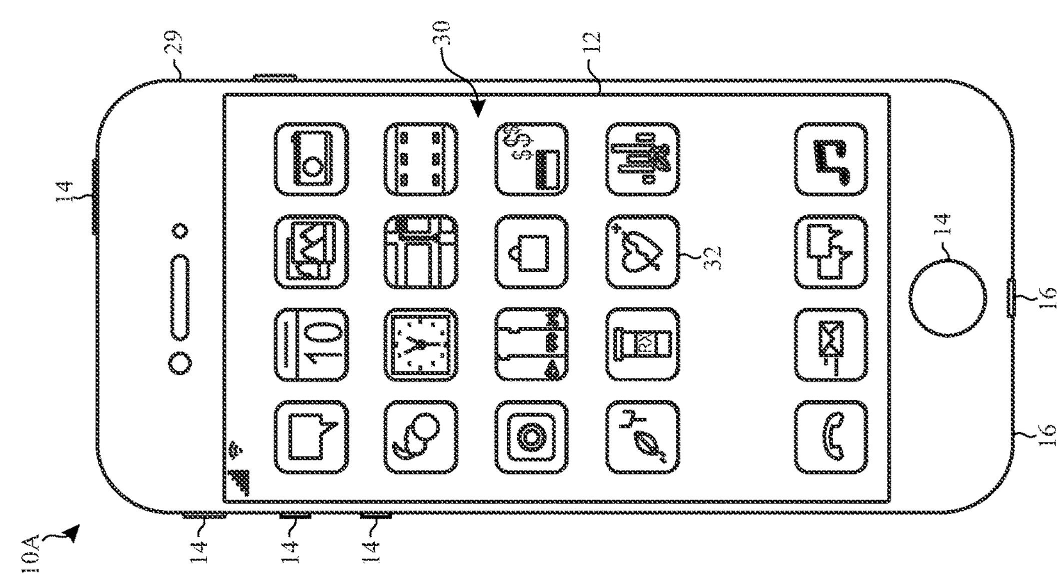
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

The handheld device 10A includes an enclosure 29 (e.g., housing). The enclosure 29 may protect interior components from physical damage and/or shield them from electromagnetic interference. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Input devices 14 may extend through the enclosure 29. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. The I/O ports 16 may also extend through the enclosure 29. In some embodiments, the I/O ports 16 may include an audio jack to connect to external devices. As previously noted, the I/O ports 16 may include one or more speakers that output sounds from the handheld device 10A.

Figure 3:
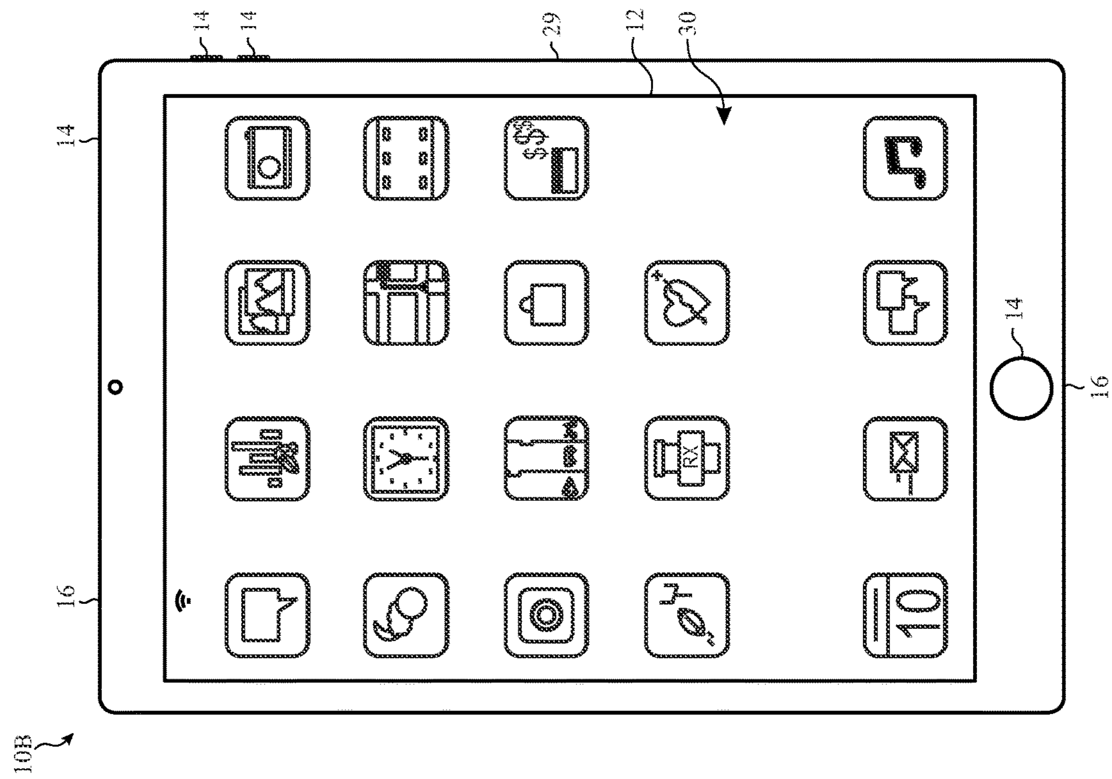
FIG. 3 is another example of the electronic device of FIG. 1, in accordance with an embodiment of the present disclosure.
Figure 4:
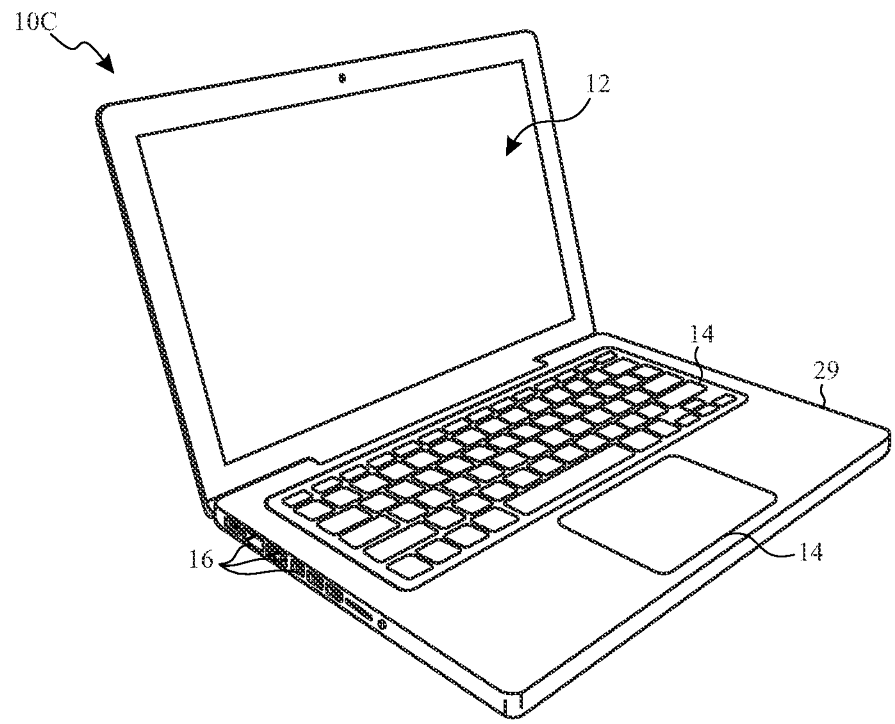
FIG. 4 is another example of the electronic device of FIG. 1, in accordance with an embodiment of the present disclosure.
Figure 5:
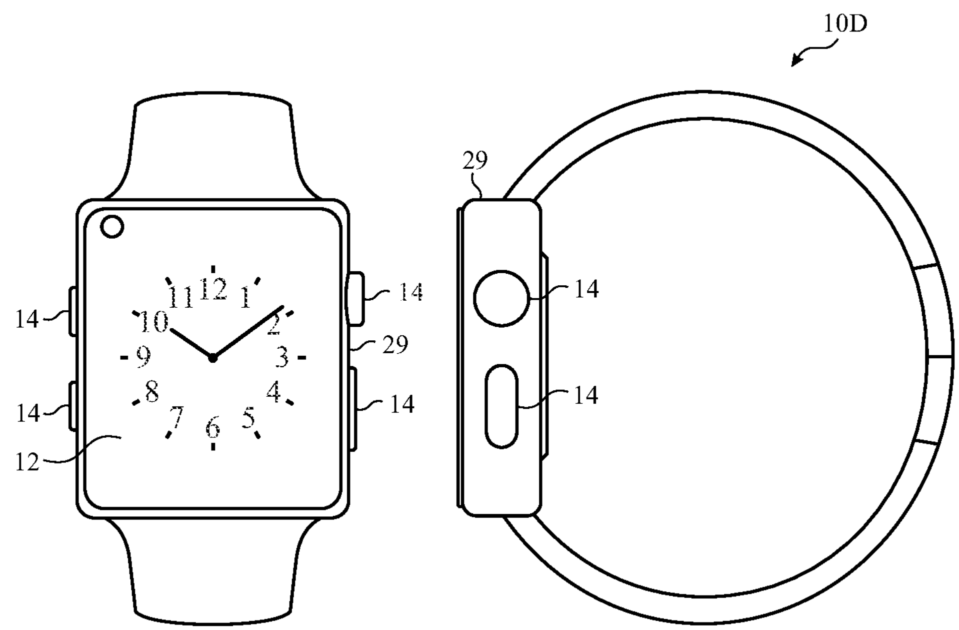
FIG. 5 is another example of the electronic device of FIG. 1, in accordance with an embodiment of the present disclosure.

Another example of a suitable electronic device 10 is a tablet device 10B shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 29.

Figure 6:
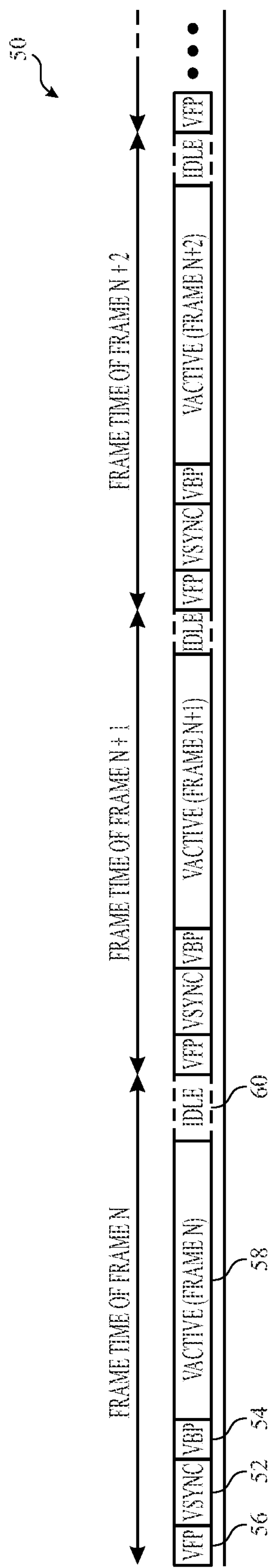
FIG. 6 is a block diagram representative of parts of different frames of image data, in accordance with an embodiment of the present disclosure.

FIG. 6 is a block diagram that illustrates portions of frames of image data that may be used in accordance with embodiments described herein. Referring to FIG. 6, image data 50 includes frames N, N+1, and N+2. Each frame of the image data 50 may include a vertical sync (VSYNC) portion 52, a vertical back porch (VBP) portion 54, a vertical front porch (VFP) portion 56, and a vertical active (VACTIVE) portion 58. The VSYNC portion 52 may include information regarding synchronization pulses that synchronizes the image data for vertical rows on the display 12. The VFP portion 56 and the VBP portion 54 may provide buffering periods between the VSYNC portion 52, such that the portion of the image data 50 that will be visible by the display 12 during the active area (e.g., VACTIVE portion 58) is specified. The VACTIVE portion 58 may then provide the image data for the rows of pixels that are part of the display 12.

When the image data 50 is being used to depict images on the display 12 and the external display 28, the external display 28 may send a follower-go signal during an IDLE portion 60 of the image data 50. As shown in FIG. 6, the IDLE portion 60 occurs immediately after the VACTIVE portion 58. In some embodiments, the image processing circuitry 27 may receive the image data 50 from the processor(s) 18 to process and depict images that are to be displayed via the display 12. If the image processing circuitry 27 receives a follower-go signal from the external display 28 during the IDLE portion 60 of the image data 50, the image processing circuitry 27 may proceed to the VFP portion 56 to start processing the next frame of image data.

Keeping this in mind, certain applications may involve coordinating the operation of the image processing circuitry 27, such that the video timing operations follows to an external component (e.g., external display 28). As such, the IDLE portion 60 may be used to facilitate a video timing coordination between the image processing circuitry 27 and the external display 28 such that the video timing of the image processing circuitry 27 can be implicitly adjusted based on an external trigger. By relying on the follower-go signal to proceed to the next frame of image data, the image processing circuitry 27 may adapt its video timing to avoid drift between two entities running on clocks derived from different crystals.

During the IDLE portion 60, a line counter of the image processing circuitry 27 may be incremented at line granularity with horizontal timing signals being generated as usual as long as the follower-go signals are not received. If the follower-go signal is received during the IDLE portion 60, the line counter may wait for a subsequent line boundary time period before transitioning to the VFP portion 56 and continues counting as usual. By controlling the duration of IDLE, the image processing circuitry 27 may adjust the frame time to meet a target timing at a granularity of up to one line time.

The external device (e.g., external display 28) is expected to issue the follower-go signals at valid times. If the image processing circuitry 27 receives the follower-go signal outside of the IDLE portion 60, the image processing circuitry 27 may be ignored with an interrupt being asserted to indicate an unexpected event for the lack of the follower-go signal. The line number corresponding to the first such occurrence in a frame shall be logged for debug purposes by the image processing circuitry 27.

If the follower-go signal is not received by image processing circuitry 27 within a configurable amount of time (e.g., maximal IDLE period), image processing circuitry 27 may transition to the VFP portion 56 of the subsequent frame with an interrupt being asserted to indicate the unexpected event that the IDLE time has expired. The corresponding line number shall be logged by image processing circuitry 27 for debug purposes.

With the foregoing in mind, it should be noted that line interrupts during the VFP portion 56, the VSYNC portion 52, the VBP portion 54, and the VACTIVE portion 58 behave as usual, but the image processing circuitry 27 may not configure any line interrupts during the IDLE portion 60. In some embodiments, the image processing circuitry 27 shall remain in the IDLE portion 60 for at least 1 line to allow the external display 28 a sufficient amount of time to send the follower-go signal. As such, upon startup, the image processing circuitry 27 may start in the IDLE portion 60 and wait for the follower-go signal before transitioning to the VFP portion 56.

In some embodiments, the entire frame of image data may include a certain number of lines, such that the VACTIVE portion 58 makes up a first portion of the number of lines and the IDLE portion 60 makes up a second portion of the number of lines. Each line in the frame of image data has an identical duration. As such, the image processing circuitry 27 may track the beginning of each new line and initiate a new frame of image data at the beginning of a next line upon receiving the follower-go signal. However, if the follower-go signal is not received, the image processing circuitry 27 may instead initiate the new frame of image data at the beginning of a predetermined or specific line number. That is, the image processing circuitry 27 may initiate the new frame of image data at the beginning of the predetermined or specific line number if the follower-go signal is not received by the predetermined line number.

Figure 7:
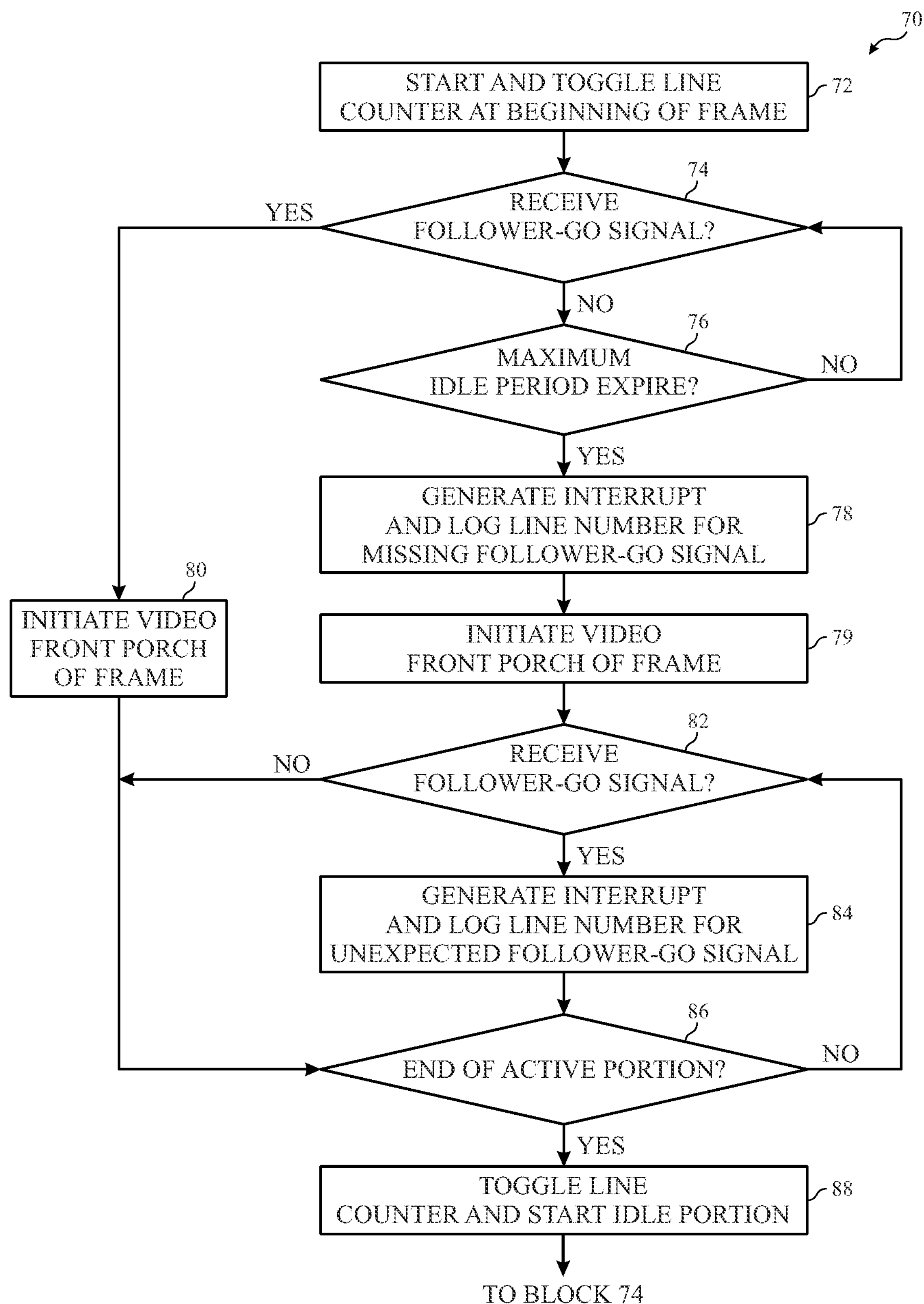
FIG. 7 is a flow chart of a method for coordinating the processing of image frame data using image processing circuitry based on signals received via an external display, in accordance with an embodiment of the present disclosure.

FIG. 7 illustrates a flow chart of a method 70 that the image processing circuitry 27 may undertake to coordinate the timing of the image data 50 for two or more display devices. Although the method 70 is described in a particular order, it should be understood that the method may be performed in any suitable order. In addition, although the method 70 is described as being performed by the image processing circuitry 27, it should be noted that any suitable processing circuitry may perform the method 70 described herein.

Referring now to FIG. 7, at block 72, the image processing circuitry 27 may receive the image data 50, start a line counter, and toggle the line counter at the beginning of the frame. As such, the image processing circuitry 27 may begin processing the image data 50 by waiting in an IDLE time period. By way of example, FIG. 8 illustrates a timing diagram 100 that depicts a relationship between receiving the follower-go signal and initiating the processing of the image data 50, as described above.

Figure 8:
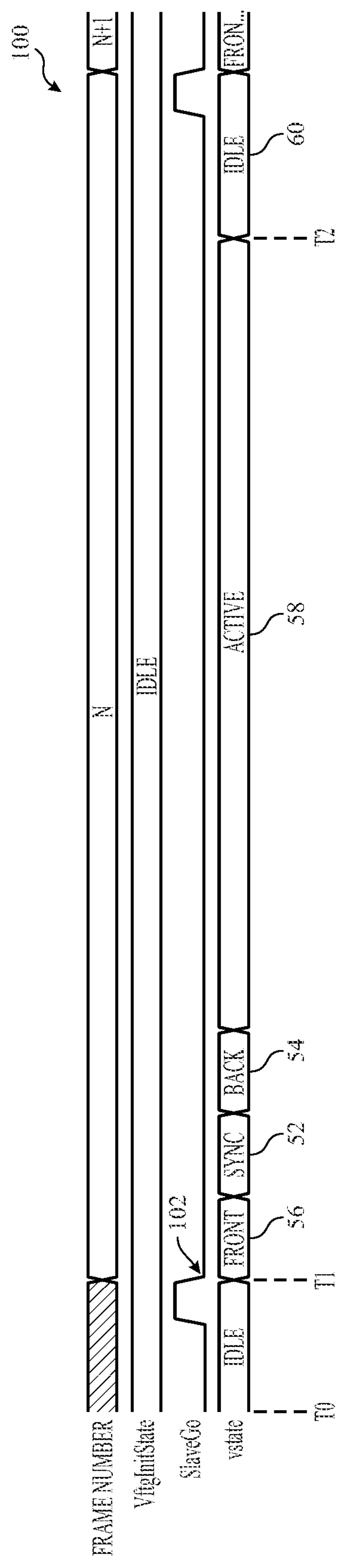
FIG. 8 is a timing diagram for a frame of image data, in accordance with an embodiment of the present disclosure.

Referring to FIG. 8, at time t0, the image processing circuitry 27 may start the line counter and begin toggling the line counter until it receives the follower-go signal. Referring back to FIG. 7, at block 72, the image processing circuitry 27 may determine whether the follower-go signal is received from an external device (e.g., external display 28). If the follower go signal has not been received, the image processing circuitry 27 may proceed to block 76 and determine whether a maximum IDLE time period has expired. The maximum IDLE time period may be configurable by a user, modified over time to accommodate expected drifts between the clock of the image processing circuitry 27 and the clock of the external device, and the like. If the maximum IDLE time period has not expired, the image processing circuitry 27 may return to block 74 and continue monitoring for the follower-go signal.

After the maximum IDLE time period expires, the image processing circuitry 27 may proceed to block 78 and generate an interrupt to log a line number at the end of the maximum IDLE time period. The line number may be used for debugging purposes to determine whether the maximum IDLE time period is sufficient to allow the external device to send the follower go signal or the like. The image processing circuitry 27 may then begin processing the image data at block 79 by initiating the VFP portion 56 of the frame of image data 50.

The image processing circuitry 27 may then proceed to block 82 and determine whether the follower go signal has been received after the maximum IDLE time period. If the follower go signal is received after maximum IDLE time period has expired, the image processing circuitry 27 may proceed to block 84 and generate an interrupt and log a line number for the unexpected follower signal. The logged line number may then be used to better synchronize the IDLE portion 60 during other frames of the image data 50 or the like. The image processing circuitry 27 may then determine whether the VACTIVE portion 58 of the image data 50 has ended at block 86 and proceed to block 88 after the VACTIVE portion 58 ends. At block 88, the image processing circuitry 27 may toggle the line counter and start the IDLE portion 60 of the frame of the image data. For example, referring to the timing diagram 100, at time t2, the VACTIVE portion 58 ends and the IDLE portion 60 begins. If, at block 86, the image processing circuitry 27 determines that the end of the VACTIVE portion 58 has not been reached, the image processing circuitry 27 may return to block 82.

Referring briefly back to block 74, the image processing circuitry 27 may proceed to block 80 after receiving the follower-go signal. At block 80, the image processing circuitry 27 may begin processing the image data 50 by initiating the VFP portion 56 of the frame of image data 50. For instance, at time t1 of the timing diagram 100 in FIG. 8, a follower-go signal 102 may have been received by the image processing circuitry 27. In some embodiments, the follower-go signal 102 may be a pulse and the end of the pulse may cause the image processing circuitry 27 to proceed to block 80. However, it should be noted that in other embodiments, the image processing circuitry 27 may proceed to block 80 at the rising edge of the follower-go signal 102 or any other suitable time associated with the reception of the follower-go signal 102.

After beginning to process the frame of image data during the VFP portion 56, the image processing circuitry 27 may proceed to block 86 and determine whether the VACTIVE portion 58 of the image data 50 has ended. As mentioned above, the image processing circuitry 27 may proceed to block 88 or return to block 82 depending on whether the VACTIVE portion 58 has ended.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:

receiving, via a processor, a first frame of image data, wherein the first frame of image data comprises a plurality of lines, an active portion, and an idle portion, wherein the active portion comprises data for presenting one or more images via a first display of a first electronic device, and wherein the idle portion corresponds to an amount of time for the processor to wait prior to processing a second frame of image data and receiving a signal from a second electronic device;

processing, via the processor, the second frame of image data subsequent to the first frame of image data after the amount of time expires, wherein the second electronic device is separate from the first display; and adjusting the amount of time in response to the amount of time expiring and the signal not being received from the second electronic device during the amount of time.

2. The method of claim 1, comprising logging, via the processor, a line number of the plurality of lines in a memory in response to the amount of time that corresponds to the idle portion expiring and the signal not being received from the second electronic device during the amount of time.

3. The method of claim 1, comprising:

receiving, via the processor, the signal after the amount of time; and logging, via the processor, a line number of the plurality of lines in a memory in response to receiving the signal.

4. The method of claim 3, comprising generating an interrupt in response to receiving the signal.

5. The method of claim 3, adjusting the amount of time based on the line number.

6. The method of claim 1, comprising toggling a line number of the plurality of lines after an additional amount of time associated with the active portion expires.

7. The method of claim 1, wherein the signal comprises a pulse.

8. The method of claim 1, wherein the idle portion of the first frame of image data immediately precedes a vertical front porch (VFP) portion of the second frame of the image data.

9. The method of claim 1, wherein the signal comprises a toggle.

10. An electronic device comprising:

a display; and image processing circuitry configured to:

receive a frame of image data, wherein the frame of image data comprises a plurality of lines, an active portion, and an idle portion, wherein the active portion comprises data for presenting one or more images via the display, and wherein the idle portion corresponds to an amount of time for the image processing circuitry to wait prior to processing a second frame of image data and receiving a signal from a second electronic device;

initiate processing of an additional frame of image data in response to the idle portion ending and the signal not being received during the amount of time, wherein the display is associated with a first clock and an additional display is associated with a second clock; and adjust the amount of time in response to the idle portion ending and the signal not being received during the amount of time.

11. The electronic device of claim 10, wherein the signal is configured to cause the image processing circuitry to cause the display and the additional display to synchronously present one or more additional images of the additional frame of image data.

12. The electronic device of claim 10, wherein the image processing circuitry is configured to log a line number of the plurality of lines in a memory in response to the amount of time that corresponds to the idle portion expiring and the signal not being received from the second electronic device during the amount of time.

13. The electronic device of claim 12, wherein the image processing circuitry is configured to adjust the amount of time based on the line number.

14. The electronic device of claim 10, wherein the image processing circuitry is configured to adjust the amount of time based on the signal being received during the active portion.

15. Image processing circuitry configured to perform one or more operations comprising:

receiving a frame of image data, wherein the frame of image data comprises a plurality of lines, an active portion, and an idle portion, wherein the active portion comprises data for presenting one or more images via a first display of a first electronic device, and wherein the idle portion corresponds to a period of time for the image processing circuitry to wait prior to processing a second frame of image data and receiving a signal from a second electronic device, and wherein the second electronic device is separate from the first display;

initiating processing of the frame of image data after the period of time expires; and adjusting a duration of the period of time in response to the signal not being received from the second electronic device during the period of time.

16. The image processing circuitry of claim 15, wherein the one or more operations comprise:

determining that the period of time has expired, wherein the signal has not been received from the second electronic device during the period of time; and initiating processing of an additional frame of image data at a predetermined line of the plurality of lines in response to the period of time expiring and the signal not being received during the period of time.

17. The image processing circuitry of claim 15, wherein the one or more operations comprise tracking a beginning of each line of the plurality of lines.

18. The image processing circuitry of claim 15, wherein the one or more operations comprise logging a line number in a memory in response to the signal not being received from the second electronic device, wherein the line number corresponds to a line of the frame of image data.

19. The image processing circuitry of claim 15, wherein the one or more operations comprise:

receiving the signal after the duration of the period of time; and logging a line number of the plurality of lines in a memory in response to receiving the signal.

20. The image processing circuitry of claim 19, wherein the one or more operations comprise adjusting the duration of the period of time based on the line number.

* * * * *